United States Patent [19]
Roberts

[11] 3,974,544
[45] Aug. 17, 1976

[54] LOAD BINDER SECURITY SYSTEM

[75] Inventor: Alfred M. Roberts, York, Pa.

[73] Assignee: Campbell Chain Company, York, Pa.

[22] Filed: Sept. 8, 1975

[21] Appl. No.: 611,398

[52] U.S. Cl............................. 24/68 CT; 105/477; 254/78; 280/179 A
[51] Int. Cl.² ...................... B60P 7/00; B66F 1/00; B66D 1/00
[58] Field of Search .......... 24/68 CD, 68 CT, 69 T, 24/69 CT, 68 R, 71 TD; 280/179 A; 105/486, 473, 477; 254/78; 292/264

[56] References Cited
UNITED STATES PATENTS

| | | | |
|---|---|---|---|
| 994,180 | 6/1911 | Miller | 24/69 T |
| 1,911,194 | 5/1933 | Jenkins et al. | 24/68 CT UX |
| 2,559,185 | 7/1951 | Carroll | 24/68 CD UX |
| 2,622,918 | 12/1952 | Staffe | 280/179 A X |
| 2,628,397 | 2/1953 | Olson | 24/68 CD |
| 2,630,609 | 3/1953 | Le Bus | 24/68 CT |
| 3,149,821 | 9/1964 | Wallace | 24/69 T X |

*Primary Examiner*—Donald A. Griffin
*Attorney, Agent, or Firm*—Donnelly, Maky, Renner & Otto

[57] ABSTRACT

The load binder, of any conventional type, has a length of security chain permanently attached to the same and carrying a shackle, ring or the like at its free end. A separate length of binder chain is provided having links that pass freely through the security chain and shackle; at one end a grab hook is connected to the binder chain and is of larger size than the noted shackle to preclude removal of the security chain at this end of the binder chain, while the other end of the binder chain is welded or permanently fastened at a point on the cargo transporter with which the binder is used. Accordingly, when thus installed on a flatbed or the like, the binder is normally permanently attached to the bed although adjustably positionable to the limits allowed by movement of the security chain along the length of the binder chain.

5 Claims, 1 Drawing Figure

U.S. Patent   Aug. 17, 1976   3,974,544
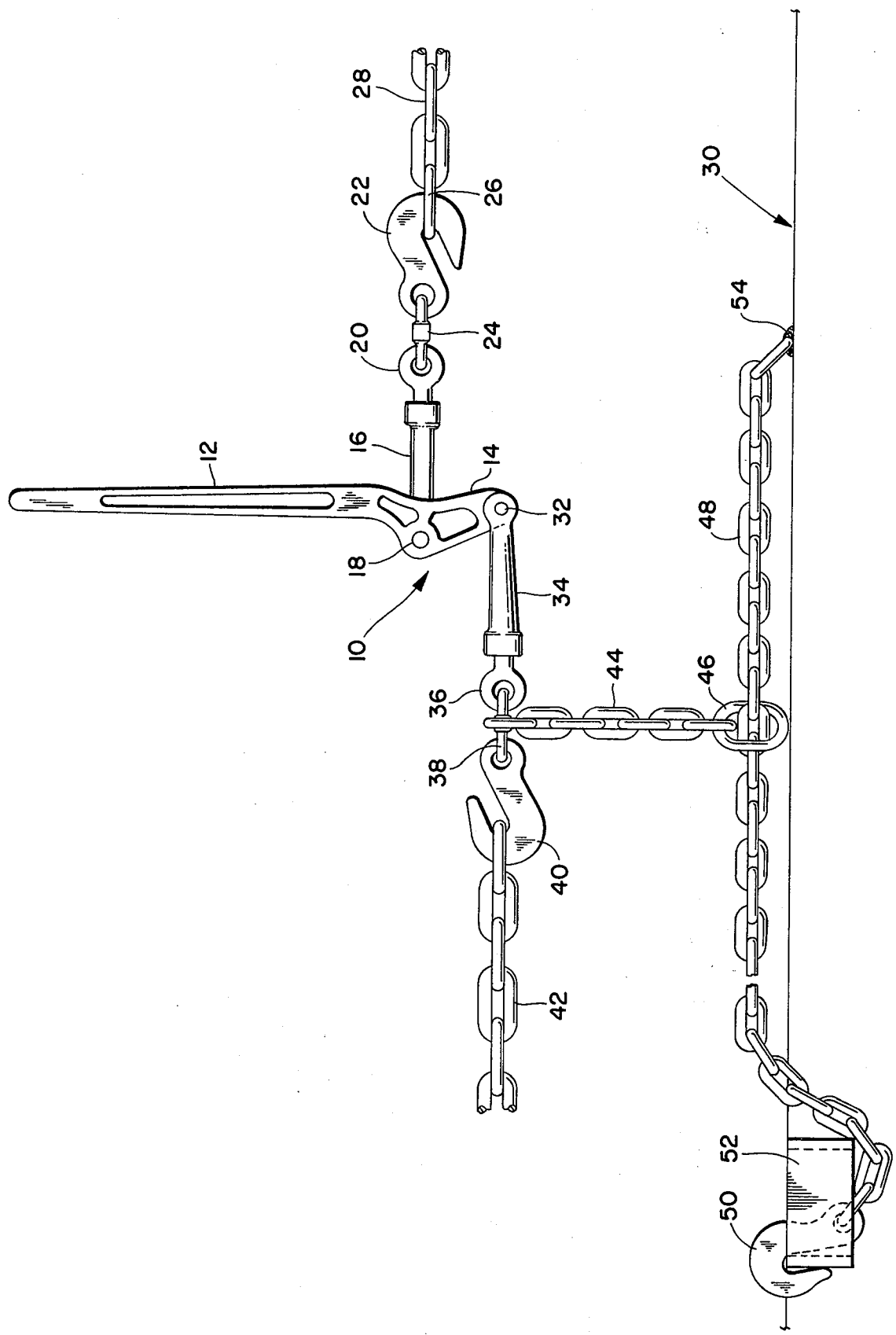

LOAD BINDER SECURITY SYSTEM

This invention, in relating as indicated to load binders, is thereby concerned with the so-named devices employed to secure cargo to transporters especially in the form of flatbeds in transportation equipment, but most commonly in truck-trailers. A typical cargo restraining system assembly will normally include opposed lengths of chain or cable and the like having their outer ends secured to the bed and, while engaged through or about a portion of the load or cargo, their free ends connected to a load binder having respectively open and closed conditions. In the open condition, there is usually just enough slack in such tie down means for disengagement of the binder to free or connect the load chain and the like, while in the closed position to which it is moved manually, the binder firmly tightens and locks the load securing means about the load.

In normal usage, there is no anti-theft protection for a load binder used in this manner and left unattended with the cargo carrier of flatbed or other type. Moreover, if the full complement of binders with which a given load support is provided is not utilized, those not in use are simply stored in as convenient a manner as possible openly and again without any protection against unauthorized removal. The result of this accessibility of the load binders has been that they are regularly stolen and, accordingly, binders of the simplest and most economical form are most used to minimize the effect of loss by theft of the same.

It is a principal object of the present invention to provide for such a load binder of any known type a special security system to preclude the aforenoted theft of a conventional binder as used and/or carried in a particular operative or inoperative exposure. It will be appreciated that such security system for a load binder does permit the latter to be potentially of more expensive improved type and, even with the least expensive binders, provides an asset in the protective retention of the same. Since the binders can for a given load transporter be quite numerous, overall anti-theft protection is obviously of substantial benefit to the owner.

Another object is to include a portion of the binder security system permanently locked into the binder itself as it may be procured from a supplier, so that independent purchase of the security elements is not necessary. Since protection against unauthorized removal should be accomplished without substantial additional cost, it follows that the security system of the invention is not itself a costly addition, but to the contrary can be inexpensively fabricated and installed.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing, the single FIGURE represents a typical and well-known type of load binder modified by the combination therewith of a security system in accordance with the present invention, the known or non-pertinent parts of a complete such installation being excluded as unnecessary to full and proper understanding of the invention.

More specifically, the standard type of prior art binder designated generally by reference numeral 10, comprises a handle 12 that is bifurcated or slotted at its angular working end 14 to receive a link 16 attached thereto by an inboard link hinge pin 18.

The relatively pivotal link 16 is provided with a swivel eye 20 at its free end and the latter is adapted to be loosely connected to a conventional grab hook 22 through an intervening welded link 24. The hook 22 of course is intended to be engaged with, and is shown in such condition, the end link 26 of one section of the load chain 28 the other end of which is attached by any suitable means, not shown, to the flatbed designated generally by reference numeral 30 upon which the cargo also not shown is to be transported.

At the extreme or outboard end of the handle and offset from the link hinge pin 18 is another link hinge pin 32 to which a clevis 34 is pivotally attached to the handle and carries at its outer end another swivel eye 36. As before, such swivel eye is connected by a welded link 38 to a grab hook 40 about which the free end of the opposite and similar load chain 42 is engaged.

Reference can be had to U.S. Pat. No. 2,630,609 for a further and more detailed showing of the above described load binder, and it is believed sufficient here to note that the binder is unlocked or opened as shown in the drawing with one of the grab hooks engaged into the proximate load holding chain end. Slack is taken out of the chain manually and the other hook is hooked into the opposed free end of the load chain, with the handle then turned toward the bed, or in a counter-clockwise closing direction, as illustrated. The handle thus rotates about the clevis hinge pins into the clevis 34 and the link 16 is rotated through the slot of the handle, the latter coming to rest in an over-center locking position to complete the restraint of the cargo, not shown, through or about which this load binding assembly, all essentially conventional, is employed.

According to the present invention, however, a length of welded security chain 44 is formed and permanently connected at one end about the binder link 38, although either binder link 24 and 38 could be used. The outer end of the chain 44 carries, again in normal permanent attachment, a shackle 46, ring and the like of particular larger size.

The security system further includes a length of binder chain 48 that normally passed freely through the security chain shackle 46, so that the latter can be moved or positioned along the length of the binder chain.

However, at one end, the binder chain has secured thereto a grab hook 50 shown hanging from a flatbed stake pocket 52, and it is important that this hook be viewed as one end member of the binder chain 48 that cannot because of its relative greater size shown pass through the shackle 46 or the like at the end of the security chain 44. With removal of the binder chain 48 thus blocked at the end where the hook 50 serves as a limiting stop for shackle 46, the other end of the binder chain 48 is permanently secured to the flatbed 30 at any convenient location, for example, by welding as shown at 54.

It will now be appreciated that, first, the hook 50 functions as one end limit for the binder chain 48, while the welded link at 54 very effectively operates as a stop for the other end of this chain in terms of removal of shackle 46 and hence security chain 44. Accordingly, there is no way possible to simply open the load binder, disengage it from the load chains, and remove it from the carrier.

The length of the binder chain 48 and security chain 44 can be varied so as best to meet particular expected applications of the load binder 10, and it will likewise be evident that the binder chain grab hook 50 can be connected anywhere that is convenient for a given load binder installation and may even be replaced with a device of a different configuration serving the same end stop function. When a hook as shown is used, this end stop means might be connected in the load chain itself or to some other part of the assembly, since its connection is merely to preclude it from freely flying about.

Permanent connections of the binder chain can, if desired, be made at both ends, although it is believed that the movable stop shown in the form of grab hook 20 may add to the flexiblity of installation of the cargo tie-down means by the load chain and binder system.

With respect to the fabrication of a load binder equipped with the new security system, this would involve attaching the length of security chain to the binder at any convenient place, for example, by the supplier of the binder. The modified binder, together with the separate length of binder chain having the grab hook or the equivalent at one end can then be shipped or delivered to a user for installation. The installer slides the binder security chain shackle or ring over the open or free end of the binder chain and welds the other end to the flatbed or cargo support means.

In such installation, the binder while not removable readily, that is, without the difficult job of breaking the security system, can be adjusted fully to the extent permitted by the interconnected security and binder chains. The unauthorized remmoval of load binders secured in this manner should thereby be very greatly deterred without limiting use of the binder in its normal application.

It will also be seen that the new security system can be applied to existing cargo tie-downs using load binders as well as supplied therewith as new equipment. Moreover, the welded end of the binder chain can be secured to the carrier bed by means other than welding, as long as this attachment is normally permanent.

I, therefore, particularly point out and distinctly claim as my invention:

1. A load binder security system, comprising a length of security chain adapted to have one end thereof normally permanently attached to the load binder and to extend freely therefrom, a separate length of binder chain of smaller size than the free end member of said security chain, so that the binder chain can pass freely through said end member of the security chain for adjustment of the latter along the length of the former, and stop means connected to at least one end of the binder chain and dimensioned relative to said end member of the security chain to preclude removal of said end member over said stop means at such end of the binder chain, and means for normal permanent fastening of the other end of the binder chain to the structure in which the binder is used to block removal of the security chain at the other end of the binder chain as well, whereby the load binder cannot normally be removed from its use installation to deter theft of the same.

2. A load binder security system as set forth in claim 1, wherein the free end member of the security chain is of closed loop form relatively enlarged with respect to the binder chain, but not passable over the stop means at the ends of the same.

3. A load binder security system as set forth in claim 2, wherein said end stop means at one end of the binder chain is a hook member.

4. A load binder security system as set forth in claim 1, wherein said end stop means at one end of the binder chain is a hook member.

5. A load binder security system as set forth in claim 4, wherein the means for fastening the other end of the binder chain is a weldment.

* * * * *